(No Model.) 2 Sheets—Sheet 1.

J. B. FAUCETTE.
DISTANCE INSTRUMENT.

No. 387,633. Patented Aug. 14, 1888.

Witnesses:
E. C. Wurdeman
J. J. Masson

Inventor,
James B. Faucette,
by E. E. Masson,
atty.

(No Model.) 2 Sheets—Sheet 2.

J. B. FAUCETTE.
DISTANCE INSTRUMENT.

No. 387,633. Patented Aug. 14, 1888.

Witnesses:
E. C. Wurdeman
S. J. Masson

Inventor:
James B. Faucette
by E. E. Masson
atty.

UNITED STATES PATENT OFFICE.

JAMES B. FAUCETTE, OF LITTLE ROCK, ARKANSAS.

DISTANCE-INSTRUMENT.

SPECIFICATION forming part of Letters Patent No. 387,633, dated August 14, 1888.

Application filed July 9, 1887. Serial No. 243,895. (No model.)

*To all whom it may concern:*

Be it known that I, JAMES B. FAUCETTE, a citizen of the United States, residing at Little Rock, in the county of Pulaski, State of Arkansas, have invented certain new and useful Improvements in Theodolites, of which the following is a specification, reference being had therein to the accompanying drawings.

My invention relates to a combination-instrument which is mounted on standards and may be used for ascertaining distances, for determining altitudes and differences of elevation, for measuring and calculating angles without the use of logarithms or other intricate calculations, and is an improvement upon the instrument shown in the United States Patent No. 289,401, granted to me December 4, 1883.

The object of my present invention is to adapt my improvements to ordinary surveying-instruments and provide them with tangential scales; and the improvement consists in certain details of construction and combination of parts hereinafter described, and particularly designated in the claims.

Figure 1:
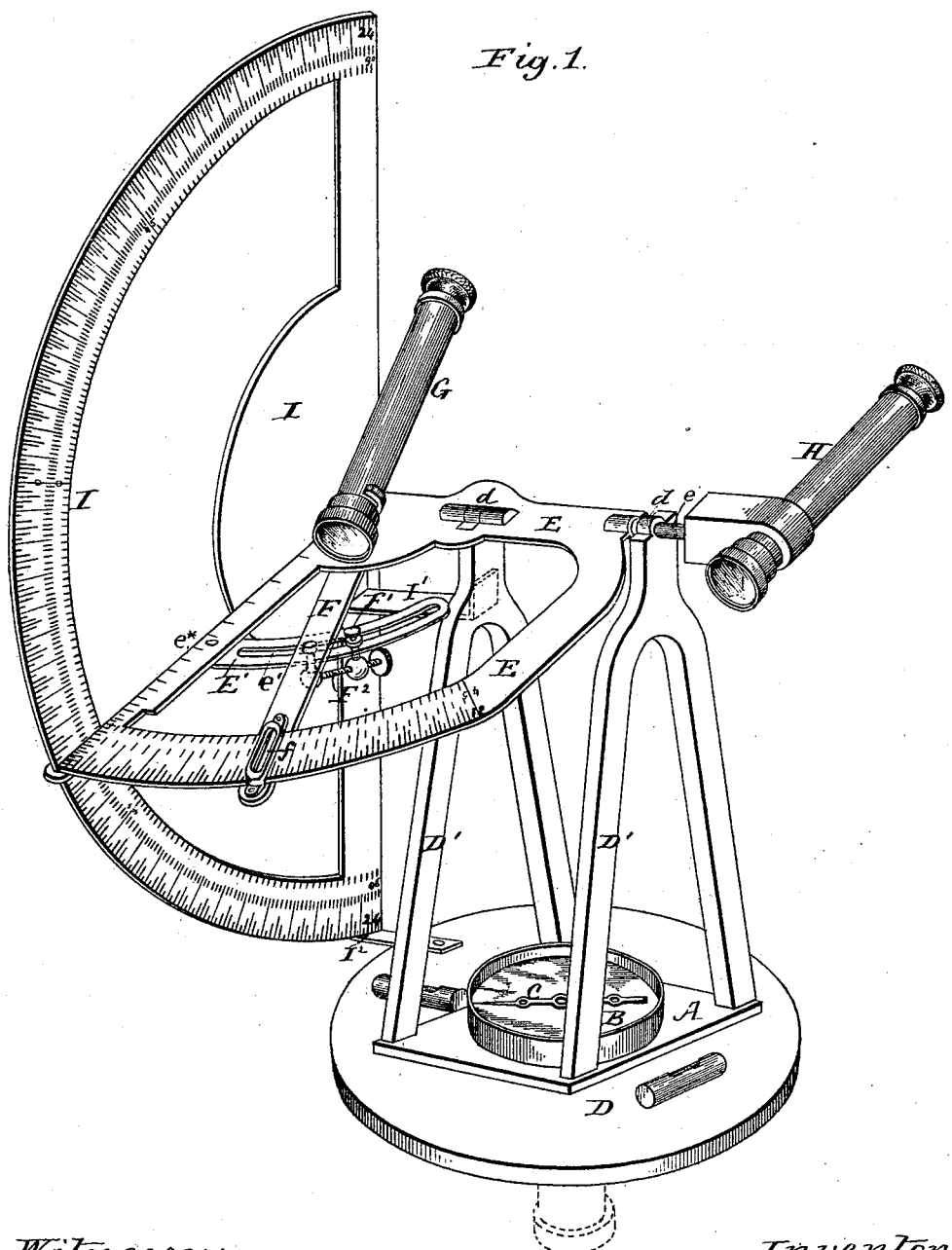
Figure 2:
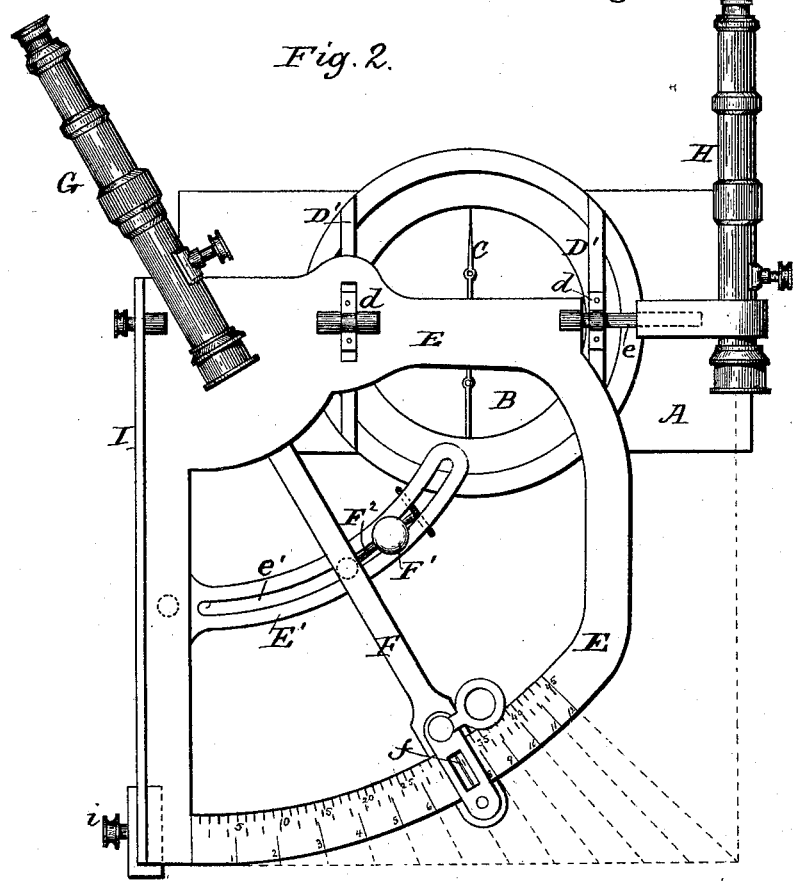

In the accompanping drawings, Figure 1 is a perspective of my improvement applied to a transit or theodolite; Fig. 2, a plan of the same.

I will first describe my improvement as applied to a transit or theodolite of ordinary construction, wherein a horizontal base-plate, A, mounted upon a tripod and carrying a compass-box, B, and needle C, is fitted above a revolving plate, D, and carries standards D'. The upper ends of the standards D' have bearings d, into which are fitted the trunnions e of the radial sector-plate E, the radius of which is in this instance twelve inches, which is marked with natural tangents and degrees for the measurement of distance and time.

A radius-bar, F, is pivoted centrally upon the sector-plate E and has a telescope, G, upon its pivotal end, and an index-hair, f, upon its movable end to intersect the graduations upon the sector-plate E in the vertical plane of the telescope. An arc, E', forming a part of the sector-plate E, is slotted, at e' to receive a clamping-screw, F', pivotally connected with the radius-bar F by a tangent-screw, F². The radius-bar may be quickly moved and secured approximately to position upon the sector-plate E by said clamping-screw and accurately adjusted thereon by the tangent-screw.

A tangent sight or telescope, H, is pivotally secured at right angles to the trunnions e of the sector-plate E to revolve therewith upon its horizontal axis, and is directed in the line of the base of a right-angled triangle, the perpendicular of said triangle being in the line of the trunnion-axis of the instrument, and the hypotenuse of said triangle being in the line of collimation of the telescope or the sights upon the radius-bar.

A vertical limb, I, preferably the half or any other sector of a circle, is graduated with degrees and natural tangents of said degrees and tangent time-divisions, and fixed securely by brackets I' I² upon the standards D' and plate D of the instrument at right angles to the horizontal axis of the sector-plate E, to permit the radial edge of said plate to swing upon its trunnions across the face of said vertical limb and intersect the graduations upon its periphery. A set-screw, $i$, or any well-known means for adjustably securing the sector-plate upon the vertical limb, is attached to the said sector-plate.

The graduations upon the sector-plate E and the vertical limb I consist of the ordinary degrees and also of tangential graduations corresponding with a standard measurement of length to be used in the calculation of distances, and with tangential time-divisions—as 15° equal one hour.

The tangential and radial sight-bars or telescope, either or both are located upon the sector-plate E or its trunnions, to extend back of its horizontal axis sufficiently to counterbalance the weight of said sector-plate, and thus permit the various movable parts of the instrument to swing freely upon their axis of rotation.

The instrument is serviceable in any survey—in both the preliminary and location survey for railroads—and in taking topography it is particularly valuable, as distances, slopes, and points along contour lines may be determined quickly and accurately without the assistance of chainmen or rodmen. A correct contour map, which will be valuable in determining the final location of the line, may thus be quickly surveyed and plotted by a topographer with but little, if any, assistance.

This instrument may be used successfully to find the range of a distant ship or of an enemy, and their position and distance may be obtained with great accuracy by placing separate instruments upon each end of a ship, the distance between said instruments being accurately measured by a tape for the base, the tangent telescope being placed in line with the base and the radial telescopes sighted upon the distant object.

By reading the natural tangent-graduations on the sector-plate and dividing the square of the distance between the sights upon the horizontal axis of the sector-plate by said tangent the distance of the object may be determined. Its low first cost and the adaptability of the tangent-scale to instruments in general use will recommend its adoption, and its simplicity of construction will suggest its use for other purposes not herein mentioned.

I claim as my invention and desire to secure by Letters Patent—

1. In a surveying-instrument, the combination of the horizontal base-plate and its magnetic needle and standards thereon, a quadrant-shaped graduated sector-limb secured at one of its radial sides to a horizontal axis supported in said standards and provided with arc and tangential divisions, a tangential sight affixed to said limb, and a radius-bar carrying sights pivoted to the horizontally-pivoted limb to move over the surface of said sector-limb, substantially as described.

2. In a surveying-instrument, the combination of the horizontal base-plate and standards thereon, the graduated sector-limb provided with arc and tangential divisions and pivoted horizontally upon the standards and located upon one side of its axial line, a tangential sight vertically movable with said sector-limb, a radius-bar carrying sights pivoted to the sector-limb, and a graduated vertical limb provided with arc and tangential divisions and secured to the standards upon which the vertically-swinging sector-limb may be adjusted, substantially as described.

3. In a surveying-instrument, the combination of the horizontal base-plate and standards thereon, a revolving horizontal sector-limb graduated with arc and tangential divisions and carried on said standards, a vertical limb located upon one side of its axial line, a tangent-sight secured to the revolving sector-limb, and a radius-bar carrying sights and pivoted to the sector-limb to swing with and move upon said limb, substantially as described.

4. The combination, in a surveying-instrument, of a horizontal plate carrying a magnetic needle and standards adapted to revolve upon a vertical axis, and a graduated quadrant-shaped sector-limb provided with arc and tangential divisions and pivoted horizontally to swing upon one side of said standards and sights, one of which is located, mainly, upon the opposite side of said standards to counterbalance the said sector-limb, substantially as described.

In testimony whereof I affix my signature in presence of two witnesses.

JAMES B. FAUCETTE.

Witnesses:
E. E. MASSON,
E. C. WURDEMAN.